United States Patent [19]
Aubert et al.

[11] Patent Number: 5,782,580
[45] Date of Patent: Jul. 21, 1998

[54] SOIL REMEDIATION METHOD

[75] Inventors: Winton G. Aubert, Anchorage, Ak.; C. Richard Knowles, South Pasadena, Calif.

[73] Assignee: Atlantic Richfield Company, Los Angeles, Calif.

[21] Appl. No.: 729,897

[22] Filed: Oct. 15, 1996

[51] Int. Cl.$^6$ ............................ B09C 1/02; B09C 1/06; B09C 1/08
[52] U.S. Cl. ............................ 405/128; 588/249
[58] Field of Search ........................ 405/128, 263, 405/264; 588/249, 255, 259, 261

[56] References Cited

U.S. PATENT DOCUMENTS

| | | | |
|---|---|---|---|
| H1158 | 4/1993 | Perkins et al. | 141/11 |
| 3,562,156 | 2/1971 | Francen . | |
| 3,772,195 | 11/1973 | Francen . | |
| 3,850,206 | 11/1974 | Canevari et al. . | |
| 3,956,138 | 5/1976 | Crockett | 252/307 X |
| 4,235,743 | 11/1980 | Canevari | 252/382 |
| 4,326,986 | 4/1982 | Canevari | 252/384 |
| 4,519,338 | 5/1985 | Kramer et al. | 405/128 X |
| 4,632,847 | 12/1986 | Lomasney et al. | 588/249 |
| 4,859,349 | 8/1989 | Clark et al. | 536/31 X |
| 4,902,167 | 2/1990 | Shelton | 405/128 |
| 5,011,330 | 4/1991 | Kittle et al. | 405/263 X |
| 5,035,537 | 7/1991 | Rose | 405/128 |
| 5,265,651 | 11/1993 | Perkins et al. | 141/1 |
| 5,265,977 | 11/1993 | Weirich et al. | 405/128 |
| 5,296,164 | 3/1994 | Thach et al. | 252/307 |
| 5,302,287 | 4/1994 | Losack | 405/128 X |
| 5,368,411 | 11/1994 | Losack | 405/128 |
| 5,372,462 | 12/1994 | Sydansk | 405/264 |
| 5,434,192 | 7/1995 | Thach et al. | 521/50 |
| 5,608,137 | 3/1997 | Wilkins | 588/259 |

*Primary Examiner*—George A. Suchfield
*Attorney, Agent, or Firm*—John L. Wood

[57] ABSTRACT

A method is provided for remediation of soils contaminated with at least one volatile organic contaminant, such as benzene, toluene, xylene, polynuclear aromatics and the like. The method includes placing a layer of a vapor barrier material over the contaminated soil and thereafter treating the soil so as to stabilize the soil and thereby reduce emissions of the volatile organic contaminants therefrom. The vapor barrier material is selected from oil-based muds, natural gels, and aqueous surfactant-based foams, and in particular, certain aqueous surfactant based foams which are relatively easy to generate and use, as well as being long-lasting in effect. The method may obviate the need to chemically treat a remediation site, or erect costly containment structures, such as a tent or canopy, to reduce emissions of the volatile contaminants during soil remediation activities.

20 Claims, 1 Drawing Sheet

5,782,580

SOIL REMEDIATION METHOD

BACKGROUND OF THE INVENTION

This invention relates to a method for remediation of soils contaminated with volatile hydrocarbon contaminants, and in particular, a method for remediation of such soils comprising the use of a vapor barrier material on top of the soil which is relatively impermeable to volatile hydrocarbons that might otherwise be emitted to the atmosphere during subsequent remediation activities.

In recent years, many governmental bodies, such as the United States Government and many state and local entities, have enacted laws which regulate the manner in which waste materials are stored or otherwise disposed, particularly industrial wastes from manufacturing operations, chemical processing, crude oil refining operations and the like. Prior to such laws, it was accepted and common for businesses to use open surface pits or ponds to store or dispose of liquid industrial waste, including wastes which comprise volatile organic compounds, like benzene, ethylbenzene, toluene, xylene, and other aromatics, which have only fairly recently been deemed toxic. As a result, there is now a need to remediate these sites and remove residual waste, which can be both on top of and within the soil, so that the waste can be disposed of in a manner consistent with the new laws.

Despite the volatile nature of many such volatile organic compounds, the soil at sites used many years ago can still contain relatively high concentration levels of such compounds. These relatively high concentrations are due to the fact that the surface of such liquid compounds, even if mixed within soil at the surface of the site, tends to form a relatively impermeable, semi-solid oxidation layer after exposure to the environment, which layer essentially hinders or otherwise prevents volatilization of any residual liquid contaminants remaining within the soil.

Present methods to remediate such contaminated sites typically involve removing the contaminated soil by mechanical means, i.e., by use of a bulldozer, backhoe, dredge, or other heavy machinery, so that the organic contaminants can be stabilized, removed and/or recovered from the soil by known ex situ methods, such as incineration, solvent extraction, or chemical treatments, and thereafter the soil is returned to the site from which it was removed. Removing such waste and contaminated soil from the site necessarily requires disturbing the surface of the site, which results in disruption of the semi-solid oxidation layer thereby increasing the amount of organic contaminants which may volatilize into the atmosphere. This increase creates a problem, in that many of the present laws limit the amount of such volatile organic compounds which can be emitted into the atmosphere from such sites, even during attempts to remediate contamination in the soil. Typically, the owner of a site must submit a plan for controlling emissions of volatile organics during remediation operations to obtain required permits to clean up the site.

One method previously used to inhibit emission of acidic organic contaminants during soil remediation involves placing lime on the surface of the site. The release of contaminants is said to be reduced due to reaction of the lime with acidic gas vapors that would otherwise escape into the atmosphere. While the use of lime may reduce the emission of such acidic organics, it is relatively expensive due to the need to transport and handle large amounts of lime. Further, lime can only be used effectively at a relatively small number of sites which are contaminated with such acidic contaminants, and after use the lime must also be removed from the site which requires further expense.

Another method employed to reduce emissions involves placement of a large, vapor-tight tent or canopy over the site to be remediated so that vapors which are released can be contained therein. The vapors are then vented to a special unit which either incinerates them or chemically recovers them for disposal elsewhere. While this method can reduce emissions, it is obviously a relatively complex and expensive procedure. As a result, use of a containment tent or canopy is typically reserved for relatively small areas.

U.S. Pat. Nos. 5,265,651; 5,296,164 and 5,434,192 disclose certain foams which are indicated as being useful for suppressing hydrocarbon vapors generated during the transportation and/or storage of crude oil and lighter hydrocarbons, particularly the loading and unloading of crude oil tankers. U.S. Pat. Nos. 3,850,206; 4,235,743; and 4,326,986 similarly disclose the use of a surfactant foam and/or film as a means to reduce hydrocarbon vapors during the loading and unloading of tanker vessels and storage tanks.

Foams have previously been employed as a fire retardant or extinguishing material for hydrocarbon liquids, as is disclosed in U.S. Pat. Nos. 3,562,156; 3,772,195; 3,956,138; and 4,859,349. Most of the foams employed as fire retardants persist for only relatively short periods of time, such as up to 30 minutes, and would be impractical for soil remediation applications.

As can be seen, it would be desirable to provide a relatively impervious vapor barrier on top of the soil surface at sites contaminated with volatile organic compounds during soil remediation activities. Such a barrier could reduce the amount of volatile organics that might otherwise be released into the atmosphere during the remediation activities. It would also be desirable to provide an alternative method to chemical treatments, such as the use of lime, and tent- or canopy-like enclosures, both of which can significantly increase the cost of remediating such sites.

SUMMARY OF THE INVENTION

The foregoing objects and advantages may be obtained according to the present invention which relates to a method to remediate soil contaminated with at least one volatile organic contaminant and which has a surface area exposed to the atmosphere. The method comprises:

placing a substantially continuous layer of a vapor barrier material selected from the group consisting of aqueous surfactant-based foams, natural gels, and oil-based muds on top of the surface area of the soil in an amount sufficient to reduce the amount of the at least one volatile organic contaminant which can volatilize into the atmosphere; and treating the soil so as to stabilize the soil.

In preferred embodiments, the vapor barrier material is an aqueous surfactant-based foam derived by expanding a fully diluted foam precursor composition comprised of:

from about 0.5 to about 6% by weight, based on weight of the composition, of one or more nonionic surfactants;

from about 0.05 to about 1% by weight, based on weight of the composition of a cationic fluorinated surfactant;

from about 1 to about 10% by weight, based on weight of the foam, of a solvent;

from about 500 to about 5000 ppm of an anionic polymer; and water.

Such foams are particularly stable and long-lasting in effect, and in many instances can persist for up to several days.

DETAILED DESCRIPTION

Figure 1:
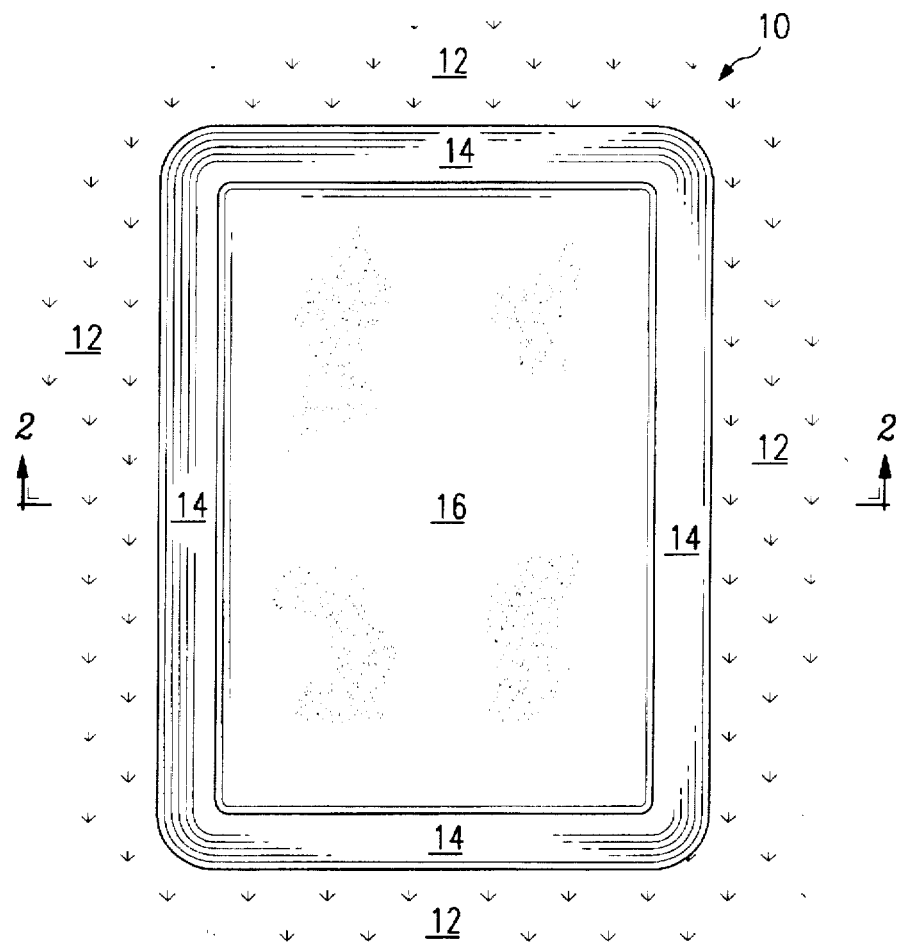
FIG. 1 is a plan view of a waste pit site with contaminated soil to be remediated according to the present invention.
Figure 2:
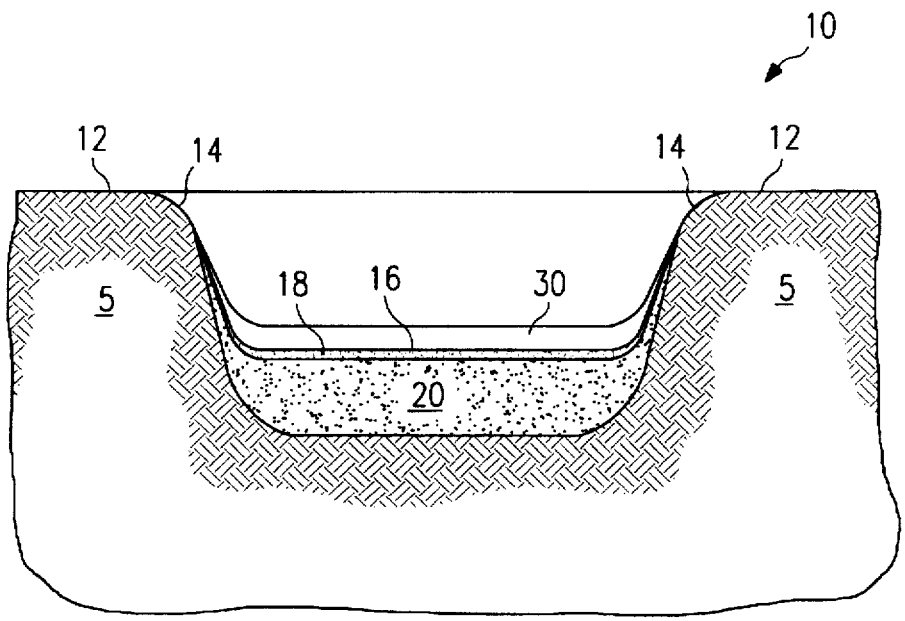
FIG. 2 is a cross-section view along line "2—2" in FIG. 1, which shows orientation of the soil within the pit.

A typical remediation site, such as a waste holding pond or pit, is illustrated by pit 10 as shown in FIGS. 1 and 2 herein. Although shown with a rectangular shape, pit 10 can be of any shape or size.

The pit 10 is generally formed on the surface of the Earth 5. The pit 10 has a bottom surface 16 with an elevation below that of an upper surface 12 and walls 14 which slope upwardly from the bottom surface 16 to the upper surface 12.

Generally, the bottom surface 16 comprises a relatively thin, semi-solid oxidation layer 18 of soil with oxidized or partially-oxidized and semi-solid residue comprising at least one volatile organic compound (now a soil contaminant) from waste previously stored in the pit.

Volatile organic contaminants can include hydrocarbons like benzene, ethylbenzene, toluene, xylene, polynuclear aromatic hydrocarbons ("PAH's"), and other residual volatile hydrocarbons, previously included with the waste placed in pit 10.

Layer 18 is typically exposed to the atmosphere above the pit 10 as shown in FIG. 2. However, if a layer of soil (not shown) is disposed on top of layer 18, it should be removed so as to expose layer 18 to the atmosphere. Unless disturbed, layer 18 hinders the volatilization and emission into the atmosphere of the volatile organic contaminant within the soil at and below the bottom surface 16. Layer 18 can range in thickness from about 1 inch to about 4 feet, and generally is from about 6 inches to about 2 feet in thickness.

Disposed below layer 18 is frequently another layer 20 of soil which is contaminated with the at least one volatile organic contaminant and layer 20 typically contains higher concentrations of the volatile organics relative to layer 18. Layer 20 can range in thickness from about one inch to about 100 feet or more.

According to an embodiment of the invention, prior to disturbing layer 18, a substantially continuous layer 30 (as illustrated in FIG. 2) of a vapor barrier material is optionally placed on top of bottom surface 16 so as to reduce the amount of the at least one volatile hydrocarbon contaminant which can volatilize into the atmosphere during subsequent remediation activities. The vapor barrier material is selected from the group consisting of aqueous surfactant-based foams, natural gels, and oil-based muds as described hereinafter. Preferably, the vapor barrier material is an aqueous surfactant-based foam.

Aqueous surfactant-based foams most preferred for use in the present invention are those disclosed in U.S. Pat. Nos. 5,296,164 and 5,434,192, the teachings of which are incorporated herein by reference. Such foams are particularly stable and long-lasting, and in many instances can persist from 12 hours and up to several days at normal ambient temperatures, i.e., from 75° to 105° F., which is particularly advantageous for remediation activities that can last several days in length. Furthermore, such foams are comprised largely of water, which is relatively inexpensive and frequently available at or near such sites. The surfactants and other components used in such foams are generally non-toxic and biodegradable. Thus, after use of such foams there are essentially no additional clean-up procedures required, as the foams degrade largely into water.

The preferred aqueous surfactant-based foams can be prepared by expanding a fully diluted foam precursor composition which comprises one or more nonionic surfactants, a fluorinated surfactant, a solvent, a polymer and water.

In general, the fully diluted foam precursor compositions comprise from about 0.5 to about 6% by weight of one or more nonionic surfactants, about 0.05 to 1% by weight of a fluorinated surfactant, about 1 to 10% by weight of a solvent, about 500 to 5,000 parts per million (ppm) of a polymer, with the balance of the composition being comprised of water. By "fully diluted" or "fully dilute", it is meant that the foam precursor composition has been fully diluted with make-up water, as defined hereinafter, and is suitable for generating an aqueous surfactant based foam.

In one embodiment, the water used in making the fully dilute foam precursor compositions, which is referred to hereinafter as "make-up water", is fresh water. As used herein, the term "fresh-water" is defined to mean an aqueous solution that includes no more than about 2% by weight of inorganic salts. In this embodiment, the fully diluted foam precursor compositions comprise from about 2 to about 4% by weight of one or more nonionic surfactants, about 0.2 to about 0.4% by weight of a fluorinated surfactant, about 2 to about 6% by weight of a solvent, about 1,000 to about 2,500 ppm of a polymer, with the balance being comprised of fresh water as the make-up water. According to this embodiment the weight ratio of the one or more nonionic surfactants to the fluorinated surfactant ranges from about 6:1 to about 12:1, and preferably the ratio ranges from about 8:1 to about 10:1.

In another embodiment, the make-up water used in the fully diluted foam precursor compositions is relatively high in saline content, such as brackish water or sea water. As used herein, the term "sea water" is inclusive of brackish water and sea water and is defined to mean an aqueous solution that includes more than about 2% by weight of inorganic salts. The foam precursor compositions used in this embodiment are advantageous when a source of fresh water is not available and sea water must be used as make-up water for the fully diluted foam precursor compositions. In this embodiment, the fully diluted foam precursor compositions comprise from about 1.5 to about 4% by weight of one or more nonionic surfactants, about 0.4 to about 6% by weight of a fluorinated surfactant, about 4 to about 8% by weight of a solvent, about 1,500 to about 3,000 ppm of a polymer, with the balance being comprised of sea water as the make-up water. According to this embodiment, the weight ratio of the one or more nonionic surfactants to the fluorinated surfactant ranges from about 1.5:1 to about 9.5:1, and preferably the ratio ranges from about 2.4:1 to about 5:1.

Those skilled in the art will recognize that, based on the relative proportions of the components of the fully diluted foam precursor compositions, the fluorinated surfactant functions as a co-surfactant with respect to the nonionic surfactant(s) and the solvent functions as a co-solvent with respect to water.

Concentrated foam compositions, which comprise the components as described hereinabove except for make-up water, can be made in advance of their use and preferably they are mixed with make-up water at the remediation site just prior to use. Concentrated foam compositions comprise one or more nonionic surfactants, a fluorinated surfactant, a polymer, a solvent and sufficient make-up water to solubilize the polymer. The one or more nonionic surfactants, the fluorinated surfactant, the solvent and the polymer are present in the concentrated foam compositions in the same relative proportion, but in higher absolute percentages since less water is present.

As indicated in detail within U.S. Pat. Nos. 5,296,164 and 5,434,192, both previously incorporated herein by reference, a high-stability and long-lasting foam may be produced by use of an ionic polymer and an ionic, fluorinated surfactant having a charge opposite that of the ionic polymer. Thus, in the foam compositions which are most preferred for use in the present invention, the fluorinated surfactant and the polymer are both ionic in nature and have opposite charges. Most preferably, the fluorinated surfactant is cationic and the polymer is anionic.

The fluorinated surfactant employed, preferably, is very slightly soluble in hydrocarbons, is highly soluble in water, and is highly surface-active to induce low air/water surface tension and film spreading characteristics. The fluorinated surfactant has a hydrophilic head and a hydrophobic tail. The hydrophobic tail, preferably, is short, such as a carbon chain having from about 8 to about 16 carbon atoms, more preferably from about 9 to about 12 carbon atoms. The fluorinated surfactant is preferably a cationic fluorinated surfactant selected from the group consisting of fluorinated quaternary ammonium halides, especially iodides and chlorides. A preferred fluorinated quaternary ammonium chloride is commercially available as FLUORAD FC-754 surfactant from Minnesota Mining & Manufacturing Company (3M). A preferred fluorinated quaternary ammonium iodide is commercially available as FLUORAD FC-350 surfactant from 3M.

As noted above, when the fully dilute foam precursor compositions include fresh water as make-up water, the compositions preferably compromise from about 0.2 to about 0.4% by weight of the fluorinated surfactant. When the fully diluted foam precursor compositions include sea-water as make-up water, the compositions preferably compromise from about 0.4 to 0.6% by weight of the fluorinated surfactant.

The polymer, preferably, is a high-viscosity polysaccharide, biopolymer or synthetic polymer that is highly interactive with the fluorinated surfactant of the compositions. The polymer preferably has a molecular weight of between about 1 and about 10 million, preferably from about 1 to about 5 million, and is anionic in nature as previously described. Also, the polymer preferably has good water solubility. The polymer increases the foam stability by retarding water drainage, reducing water evaporation, and increasing film thickness. The polymer thus improves the mechanical strength of the film.

The polymer may be a water dispersible or soluble hydrophilic colloid selected from the group consisting of cellulose derivatives, gum ghatti, gum arabic, gum tragacanth, locust bean gum, gum karaya, guar gum, carrageenan, algin, biopolymers, and mixtures thereof. These polymers may be used unmodified, as normally isolated from their source materials, or they may be modified as is well known in the polymer art such as by hydroxyalkylation, carboxyalkylation, or mixed hydroxyalkylation carboxyalkylation. Specific examples of modified polymers are carboxymethyl-2-hydroxypropylpropyl-ether guar gum and 2-hydroxy-3-(trimethyl ammonium) propyl-ether chloride guar gum. Many of these derivatives form clear solutions in water. Thus, the term water-soluble polymer is intended to mean polymers which form colloidal solutions or colloidal dispersions in water. The sources of such gums are well known and are discussed at length in U.S. Pat. Nos. 5,296,164 and 5,434,192, previously incorporated herein.

The biopolymers may be selected from xanthan gum and welan gum. Commercially available xanthan gum biopolymers can be obtained from Kelco Div., Merck & Co., Inc. under the trademark of KELZAN xanthan gum or from Pfizer, Inc. under the trademark of FLOCON xanthan gum. Welan gum is commercially available under the trade name BIOZAN® welan gum from Kelco Div., Merck & Co., Inc.

Accordingly, the polymer may comprise natural and modified natural gums such as gum ghatti, gum arabic, gum tragacanth, locust bean gum, gum karaya, guar gum, carrageenan, algin, biopolymers such as xanthan gum or welan gum and the hydroxyethyl, carboxymethyl, hydroxyethyl carboxymethyl, and hydroxypropyl ether derivatives thereof, as well as hydroxyethyl, carboxymethyl, hydroxyethyl carboxymethyl and hydroxpropyl ether derivatives of cellulose and mixtures thereof.

The synthetic polymers may be selected from polyimines, poly (acrylic acid), poly (methacrylic acid), poly (maleic acid-co-ethylene), poly (maleic acid co-ethylvinylether), poly (maleic acid-co-butylvinylether), poly (maleic acid-co-styrene), poly (maleic acid-co-indene), poly (vinylsulfuric acid), poly (styrenesulfonic acid), polyphosphate (linear), dextransulfate, poly (L-glutamic acid), and bovine serum albumin.

Preferred polymers for use in the present invention are xanthan gum, and modified guar gums such as carboxymethyl-2-hydroxypropyl-propyl-ether guar gum and 2-hydroxy-3-(trimethyl ammonium) propyl ether chloride guar gum. A particularly preferred polymer is xanthan gum having a molecular weight of from about 1 million to about 10 million, most preferably about 4 million, which is commercially available from Kelco Div., Merck & Co., Inc. in different grades, for example as KELZAN®, XANVIS® and KELTROL® xanthan gums or from Pfizer, Inc. in different grades, such as FLOCON 4800C xanthan gum. If xanthan gum having a molecular weight of less than about 1 million is used, the foams tend to be less stable.

As noted above, when the fully dilute foam precursor compositions comprise fresh water as make-up water, the compositions preferably comprise from about 1000 to 2500 ppm of the polymer. When the fully dilute foam precursor compositions comprise sea water as make-up water, the compositions preferably comprise about 1500 to 3000 ppm of the polymer.

Suitable nonionic surfactants used in the foam precursor compositions are highly water soluble, are insoluble in nonpolar hydrocarbons, are very slightly soluble in polar hydrocarbons, have a very low air/water surface tension and produce a large amount of foam. Accordingly, suitable nonionic surfactants have a hydrophilic head and a hydrophobic (lipophilic) tail, with a hydrophilic to lipophilic balance (HLB) of about 12 or greater to provide good water solubility. Preferably, the hydrophobic tail includes less than about 16 carbon atoms and most preferably from about 9 to about 12 carbon atoms to minimize solubility in oil. Also, the tail preferably is a branched alkyl chain which leads to a reduced surface tension. Reduced surface tension reduces the energy needed to make foam which in turn leads to a greater foam height.

As noted above, preferred fully diluted foam precursor compositions used in the present invention comprise from about 0.5 to about 6% by weight of one or more nonionic surfactants. Foams produced from the fully diluted foam precursor compositions will tend to be less stable if less than about 0.5% by weight of the nonionic surfactants are included in the formulation. The performance of the foam formulations will not be enhanced and may be compromised when the foam compositions include more than about 6% by weight of the nonionic surfactants.

When the make-up water of the foam precursor compositions is fresh water, the nonionic surfactants preferably comprise from about 2 to about 4% by weight of the compositions and may be selected from the family of alkyl polyoxyethylenes. A preferred class of alkyl polyoxyethylenes is alkyl polyethylene-glycol ethers wherein the alkyl group thereof includes from about 8 to about 16 carbon atoms, preferably from about 12 to about 13 carbon atoms, and wherein the water-soluble portion includes from about 4 to about 40, preferably about 10 to about 20, ethylene oxide repeating units. Suitable alkyl polyethylene-glycol ethers are trimethyl nonylpolyethylene-glycol ether which is commercially available as TERGITOL TMN-10 to TMN-6 alkyl polyethylene-glycol ethers from Union Carbide Corporation and EMULPHOGENE BC-720 ($C_{13}EO_{9.75}$) or BC-840 ($C_{13}EO_{15}$) alkyl polyethylene-glycol ethers from Rhone-Poulenc.

Foams generated from fully diluted foam precursor compositions in which the make-up water used is sea water and the nonionic surfactants are selected from alkyl polyethylene-glycol ethers are often unstable and collapse after the passage of a few hours.

Accordingly, when the make-up water used is sea water, the nonionic surfactants preferably compromise from about 1.5 to about 4% by weight of the compositions and may be selected from the family of alkyl polyglycosides wherein the alkyl chain thereof includes from about 8 to about 14 carbon atoms and wherein the hydrophilic portion includes about 1 to about 2 repeating glucose units. These surfactants or mixtures thereof have a hydrophilic-lipophilic balance (HLB) number of greater than about 12 and thus have good water solubility and low susceptibility to the salinity of the sea water used as make-up water. The hydrophobic portion of the nonionic surfactants preferably includes less than about 14 carbon atoms, most preferably, from about 9 to about 12 carbon atoms, thus providing very low hydrocarbon solubility. Preferably, the hydrophobic portion of the nonionic surfactants is a branched alkyl chain which reduces surface tension of the foam composition.

Suitable alkyl polyglycosides are those having the formula:

$$C_nH_{2n+1}O(C_6H_{10}O_5)_xH$$

wherein n is from about 8 to about 14; and x is from about 1 to about 2.

Commercially available alkyl polyglycosides are APG-225, APG-300, APG-325, APG-600 and APG-625 from Henkel Corporation. The formulae and properties of APG-225, APG-300, APG-325, APG-600 and APG-625 are indicated in Table 1. The foam precursor compositions used in the present invention may include one or more such alkyl polyglycosides.

TABLE 1

| Product | Formula | Activity | HLB[1] |
|---------|---------|----------|--------|
| APG-225 | $C_{8-10}H_{17-21}O(C_6H_{10}O_5)_{1.8}H$ | 70.9 wt. % | 13.6 |
| APG-300 | $C_{9-11}H_{19-23}O(C_6H_{10}O_5)_{1.4}H$ | 50.9 wt. % | 12.6 |
| APG-325 | $C_{9-11}H_{19-23}O(C_6H_{10}O_5)_{1.6}H$ | 68.0 wt. % | 13.1 |
| APG-600 | $C_{12-16}H_{25-33}O(C_6H_{10}O_5)_{1.4}H$ | 49.3 wt. % | 11.5 |
| APG-625 | $C_{12-16}H_{25-33}O(C_6H_{10}O_5)_{1.6}H$ | 50.3 wt. % | 12.1 |

[1]HLB refers to the hydrophilic-lipophilic balance number.

The solvent preferably is highly soluble in water, has a very high affinity for water, increases the thickness and mechanical strength of the film, promotes the formation of structured liquid phases in the film, improves film elasticity and improves foam fluidity. The solvent also enhances the compatibility of the components of the concentrated foam compositions and contributes to the prevention of gelling of the compositions. By virtue of increasing the film thickness and mechanical strength, the solvent reduces the rates of gas diffusion through and water evaporation from the foams. The solvent, preferably, is selected from alcohols such as methanol, ethanol, isopropanol, glycerol, ethylene glycol, polyethylene glycol, and combinations thereof. The polyethylene glycol, preferably, has a molecular weight of from about 600 to about 4000.

The final foam is generated from the fully diluted foam precursor compositions using commercially available equipment which expand the compositions to produce a foam. Suitable foams may be obtained using an expansion ratio of from about 10 to about 1000 parts by volume of an expansion gas, such as nitrogen, carbon dioxide, flue gas or air, to about 1 part by volume of fully dilute foam precursor solution. Commercially available and conventional proportioning units and foam generators such as aspirator-type generators for medium expansion ratios of up to about 200, such as the MINI-X-II generator Mini-X-II by Mining Safety Appliances Company, and fan-type generators for high expansion ratios of above about 200, such as the SUPERJET-X-II generator by Rockwood Systems Corp., may be used to produce the final foam. However, as can be appreciated by those skilled in the art, the foams used in the present invention may be produced by any conventional proportioning units and foam generators.

A preferred foam precursor composition comprising fresh water as make-up water and generating a foam with high stability and having a persistence of from about 3 to 5 days below 90° F. and about 24 hours at 105° F., comprises 4.0% by weight of trimethylnonyl-polyethylene glycol ether (TERGITOL TMN-10 alkyl polyethylene), 0.4% by weight of a cationic fluorinated quaternary ammonium chloride (FLUORAD FC-754 surfactant-glycol ether from 3M), 6.0% by weight of glycerol, 1600 ppm of anionic xanthan gum (FLOCON 4800C xanthan gum from Pfizer); with the balance being fresh water as make-up water.

An alternative preferred foam precursor composition comprising fresh water as make-up water and generating a foam with high stability and having a persistence of from about 3 to 5 days below 90° F. and about 24 hours at 105° F., comprises 2.0% by weight of trimethylnonyl-polyethylene glycol ether (TERGITOL TMN-10 alkyl polyethylene-glycol ether), 0.225% by weight of a cationic fluorinated quaternary ammonium chloride (FLUORAD FC-754 surfactant), 5.0% by weight of glycerol, 1800 ppm of anionic xanthan gum (FLOCON 4800C xanthan gum); with the balance being fresh water as make-up water.

A preferred precursor composition comprising sea water as make-up water and generating a foam with the high stability comprises 1.47% by weight of alkyl polyglycoside (APG 300 from Henkel), 0.5% by weight of a cationic fluorinated quaternary ammonium chloride (FLUORAD FC-754 surfactant), 6.0% by weight of glycerol, 2800 ppm of anionic xanthan gum (FLOCON 4800C xanthan gum); with the balance being sea water as make-up water.

An alternative preferred foam precursor composition comprising sea water as make-up water and generating a foam with high stability comprises 1.375% by weight of APG 225 alkyl polyglycoside, 0.638% by weight of APG 300 alkyl polyglycoside, 0.5% by weight of a cationic fluorinated quaternary ammonium chloride (FLUORAD FC-754 surfactant), 8.0% by weight of glycerol, 2800 ppm of anionic xanthan gum (FLOCON 4800C xanthan gum), with the balance being sea water as make-up water.

Natural gels which can be used in the invention include those generated by hydrating commercially available cellulosic materials, such as hydroxyethylcellulose ("HEC") and carboxymethyl hydroxyethyl cellulose ("CMHEC"). The amount of water added should be sufficient to hydrate the cellulosic material and create a gel, typically water is added in a range from about 10 to about 20% by weight, based on total weight of the water and cellulosic material.

Oil-based muds which can be used include those which are known and widely used in the oil and gas well drilling industry, and are generally comprised of a mixture of at least one clay material, such as those selected from bentonite, attapulgite and so on, and an oil, such as a natural, refined, or synthetic hydrocarbon oil. Desirably, the oil-based mud does not employ a "weighting agent", such as hematite, barite, illmenite, and sand, which is used as a densifier in drilling applications. The use of such weighting agents is not required to obtain the desired vapor barrier effect and would be an added cost.

The amount of the vapor barrier material placed on the bottom surface 16 of the pit 10 is determined empirically, due to the wide variety of volatile organic contaminants which can be present in waste storage areas, such as pit 10, and the varying governmental regulations applicable to such sites, which can include both those issued by the U.S. Environmental Protection Agency and similar state agencies. In general, a sample of contaminated soil is obtained from the site in question and then placed in a suitable container. On top of the soil in the container, a continuous layer of the desired vapor barrier material (as previously described) is then placed and thereafter samples of the air over the soil are periodically taken and analyzed, such as with a chromatograph, to determine the concentration of volatile organic contaminants in the air over the so-treated soil. The amount of vapor barrier material applied should be sufficient to maintain the concentration of the volatile organic contaminants in the air below the maximum concentration specified in the applicable governmental regulation.

After placing the vapor barrier material, the contaminated soil at and below the bottom surface 16 of pit 10 can be treated by any conventional method so as to stabilize the soil. Preferably, remediation of the soil is accomplished by removal of the contaminated soil by mechanical means, such as the use of a bulldozer, dredge, or backhoe, which soil after removal is then preferably treated in an ex-situ method, such as by incineration, solvent extraction, or chemical treatment (such as with lime, cementitous material, or another chemical that reacts or otherwise combines with the organic contaminant) to stabilize the soil, and preferably by incineration or solvent extraction so as to stabilize the soil by removing or at least reducing the concentration of the volatile organic contaminant therein. By "stabilize the soil", it is meant herein that the volatility of the volatile organic contaminant is reduced by such treatment such that the soil, upon being exposed to the atmosphere, will meet the applicable governmental regulations for the volatile organic contaminant in question. After treatment, the soil is preferably replaced back into the Earth at the site from which it was removed.

In another embodiment, contemporaneously with removal of layer 18, the vapor barrier material is applied to pit 10 upon removal of layer 18 so as to reduce the amount of the at least one volatile hydrocarbon contaminant which volatilizes into the atmosphere during subsequent remediation activities for the pit 10, such as remediation efforts for layer 20. The foregoing can be accomplished, for example, by spraying the vapor barrier material onto the site from areas adjacent to the pit 10, or from the trailing end of the heavy equipment used to remove layer 18. If layer 20 is relatively thick (such as from about 10 feet to over 100 feet in thickness), then it may be desirable to remove layer 20 in successive stages, i.e., each stage comprises the removal of a layer of the contaminated soil which is several feet in thickness. The vapor barrier material can be applied repeatedly in the same fashion, as previously described hereinabove, contemporaneously with the removal of the layer of soil for each such stage of the operation.

Other embodiments will be apparent to those skilled in the art upon reading the disclosure herein, all of which are intended to be within the scope and spirit of the present invention.

SPECIFIC EMBODIMENT

The following example is intended to illustrate the invention and should not be construed as limiting the scope of the appended claims.

A waste pit previously used for holding waste materials from a petroleum refining process is selected for remediation. The pit has a floor which is essentially rectangular in shape with dimensions of approximately 100 feet by 200 feet. Analysis of the soil below the bottom of the pit reveals that it contains significant concentrations of aromatic hydrocarbons, such as benzene, toluene, and xylene. The soil analysis also indicates that the soil below the floor contains a semi-oxidized layer of about 1 foot in average thickness, with an underlying contaminated soil layer of about 40 feet in average thickness.

A surfactant-based foam is selected for use in reducing emissions of volatile organics during remediation operations at the site. To generate the foam, a fully diluted foam precursor composition containing 4.0% by weight of trimethylnonylpolyethylene glycol ether (TERGITOL TMN-10 alkyl polyethylene-glycol ether), 0.4% by weight of a cationic fluorinated quaternary ammonium chloride (FLUORAD FC-754 surfactant from 3M), 6.0% by weight of glycerol, 1600 ppm of anionic xanthan gum (FLOCON 4800C xanthan gum from Pfizer); with the balance being fresh water as make-up water is provided to the site.

A sample of the contaminated soil below the pit floor is obtained and the thickness of the layer of the surfactant based foam necessary to meet the applicable regulatory standard is determined according to the general empirical procedure previously described in the Detailed Description hereinabove. According to this procedure, the layer of foam should be one foot in height, based on the contaminants present and their concentration in the soil. Based on the dimensions for the pit floor (100'×200'), the volume of foam necessary to place on the floor of the pit is about 149,600 gallons.

The contaminated soil is removed from the floor of the pit in stages using bulldozers, with each stage in such operation being a layer of soil of about 5 feet in thickness. Contemporaneously upon removal of the soil for each stage, a layer of foam of about 1 foot in thickness is sprayed on areas excavated by the bulldozers.

The foam is generated using a MINI-X-II aspirator-type foam generator obtained from Mining Safety Appliances Company and having an expansion ratio of about 200. The fully diluted foam precursor composition is used in the generator, with about 750 gallons of the dilute solution used to generate the desired volume of foam. The foam generator and spray equipment are located on a truck which can readily move about the periphery of the waste pit. The foregoing procedure is repeated for each stage until substantially all of the contaminated soil is removed from the site.

After removal, the soil is placed in an incinerator which stabilizes the soil and removes the volatile organic contaminants therein by thermal destruction. After treatment, the soil is replaced back into the excavation associated with the former waste pit.

Although one specific embodiment of the present invention has been described hereinabove, various substitutions and modifications may be made to the specific features of the invention, as those skilled in the art can appreciate, without departing from the scope and spirit of the appended claims.

What is claimed is:

1. A method to remediate soil contaminated with at least one volatile organic contaminant and having a surface area exposed to the atmosphere, the method comprising:

placing a substantially continuous layer of a vapor barrier material selected from the group consisting of aqueous surfactant-based foams, natural gels, and oil-based muds on top of the surface area of the soil in an amount sufficient to reduce the amount of the at least one volatile organic contaminant which can volatilize into the atmosphere; and treating the soil so as to stabilize the soil.

2. The method of claim 1 further comprising the step of removing the soil by mechanical means prior to treating the soil.

3. The method of claim 2 wherein the soil is removed in successive stages, each stage comprising removal of at least a portion of the contaminanted soil in the form of a layer from the site.

4. The method of claim 3 wherein contemporaneously with removal of each layer of contaminated soil, the layer of the vapor barrier material is placed on the surface of the contaminated soil which remains at the site.

5. The method of claim 2 wherein the soil, after removal, is treated by an ex situ method selected from the group consisting of incineration, solvent extraction, and chemical treatment to stabilize the at least one volatile organic contaminant therein.

6. The method of claim 5 further comprising replacing the soil after treatment back into the area from which the soil was removed.

7. The method of claim 1 wherein the vapor barrier material is an aqueous surfactant-based foam prepared by expanding a fully dilute foam precursor composition which comprises:

a) from about 0.5 to about 6% by weight, based on weight of the foam precursor composition, of one or more nonionic surfactants;

b) from about 0.05 to about 1% by weight, based on weight of the foam precursor composition, of an ionic fluorinated surfactant;

c) from about 1 to about 10% by weight, based on weight of the foam precursor composition, of a solvent;

d) from about 500 to about 5000 ppm of an ionic polymer; and e) water.

8. The method of claim 7 wherein the water used in making the fully dilute foam precursor composition is fresh water.

9. The method of claim 8 wherein the one or more nonionic surfactants are selected from alkyl polyethylene-glycol ethers having a hydrophilic head comprised of from about 4 to about 40 repeating ethylene oxide units and a hydrophobic tail comprised of an alkyl group having from about 8 to about 16 carbon atoms.

10. The method of claim 9 wherein the alkyl polyethylene-glycol ethers are present in an amount of from about 2 to about 4% by weight.

11. The method of claim 7 wherein the water used in making the fully dilute foam precursor composition is sea water.

12. The method of claim 11 wherein the one or more nonionic surfactants are selected from alkyl polyglycosides having a hydrophilic head comprised of from about 1 to about 2 repeating glucose units and a hydrophobic tail comprised of an alkyl group having from about 8 to about 14 carbon atoms.

13. The method of claim 12 wherein the alkyl polyglycosides are present in an amount of from about 1.5 to about 4% by weight of the foam precursor composition.

14. The method of claim 7 wherein the ionic fluorinated surfactant is a cationic fluorinated quaternary ammonium halide surfactant having a hydrophobic tail comprising from about 8 to about 16 carbon atoms.

15. The method of claim 7 wherein the solvent is an alcohol selected from the group consisting of methanol, ethanol, isopropanol, glycerol, ethylene glycol, polyethylene glycol, and combinations thereof.

16. The method of claim 7 wherein the ionic polymer is anionic and selected from polysaccharides, biopolymers, and synthetic polymers having a molecular weight of from about 1 to about 5 million.

17. The method of claim 7 wherein an expansion ratio of from about 10 to about 1000 parts by volume of a gas to about 1 part by volume of the fully dilute foam precursor composition is employed.

18. The method of claim 1 wherein the natural gel is a mixture of a cellulosic material and water.

19. The method of claim 1 wherein the oil-based mud comprises a mixture of at least one clay material and an oil.

20. A method to remediate soil in a waste site which is contaminated with at least one volatile organic contaminant and has a surface area exposed to the atmosphere, the method comprising the sequential steps of:

(a) optionally, placing a substantially continuous layer of an aqueous surfactant based foam over the surface area of the soil in an amount sufficient to reduce the amount of the at least one volatile organic contaminant which can volatile into the atmosphere, the aqueous surfactant based foam comprising:
   at least one nonionic surfactant;
   a cationic fluorinated surfactant;
   a solvent;
   an anionic polymer; and
   water;

(b) removing at least a portion of the soil contaminated with the at least one volatile organic contaminant from the site and contemporaneously placing a substantially continuous layer of an aqueous surfactant based foam over the surface area of the soil remaining at the site in an amount sufficient to reduce the amount of the at least one volatile organic contaminant which can volatilize into the atmosphere, the aqueous surfactant based foam comprising:
   at least one nonionic surfactant;
   a cationic fluorinated surfactant;
   a solvent;
   an anionic polymer; and
   water;

(c) repeating step (b) above as necessary until substantially all of the contaminated soil at the site is removed therefrom;

(d) treating the soil after its removal in an ex situ method selected from the group consisting of incineration, solvent extraction, and chemical treatment so as to stabilize the soil; and (e) replacing the soil after treatment back into the site from which the soil was removed.

* * * * *